United States Patent
Jeong et al.

(10) Patent No.: US 8,459,940 B2
(45) Date of Patent: Jun. 11, 2013

(54) BLOWER HOUSING OF HYDROGEN RECIRCULATION DEVICE OF FUEL CELL VEHICLE

(75) Inventors: Hee Seok Jeong, Seoul (KR); Sung Ho Lee, Gyeonggi-do (KR); Young Jin Son, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1270 days.

(21) Appl. No.: 11/999,923

(22) Filed: Dec. 7, 2007

(65) Prior Publication Data

US 2009/0060734 A1 Mar. 5, 2009

(30) Foreign Application Priority Data

Aug. 27, 2007 (KR) ........................ 10-2007-0085889

(51) Int. Cl.
*F01D 25/14* (2006.01)
(52) U.S. Cl.
USPC .......................................... 415/175; 415/177
(58) Field of Classification Search
USPC ................... 415/175, 176, 177, 178; 361/695
See application file for complete search history.

(56) References Cited

U.S. PATENT DOCUMENTS

| RE38,382 E | * | 1/2004 | Miyahara et al. | 361/697 |
|---|---|---|---|---|
| 6,704,196 B1 | * | 3/2004 | Rodriguez et al. | 361/679.33 |
| 7,120,018 B2 | * | 10/2006 | Shen et al. | 361/695 |
| 7,209,352 B2 | * | 4/2007 | Chen | 361/695 |
| 7,753,107 B2 | * | 7/2010 | Zhou et al. | 165/80.3 |
| 2004/0197612 A1 | | 10/2004 | Keefer et al. | |
| 2004/0265121 A1 | * | 12/2004 | Lee et al. | 415/177 |
| 2005/0036288 A1 | * | 2/2005 | Shen et al. | 361/695 |
| 2006/0203447 A1 | * | 9/2006 | Kyle et al. | 361/695 |
| 2006/0256523 A1 | * | 11/2006 | Belady | 361/695 |
| 2007/0091566 A1 | * | 4/2007 | Sun | 361/695 |

FOREIGN PATENT DOCUMENTS

| JP | 59-046768 | 3/1984 |
|---|---|---|
| KR | 10-2005-0113713 | 12/2005 |
| KR | 10-2006-0024900 | 3/2006 |

* cited by examiner

*Primary Examiner* — Edward Look
*Assistant Examiner* — Aaron R Eastman
(74) *Attorney, Agent, or Firm* — Edwards Wildman Palmer LLP; Peter F. Corless

(57) ABSTRACT

A blower housing of a hydrogen recirculation device for a fuel cell vehicle includes a plurality of cooling pins installed on a perimeter of a housing body installed in a fuel processing system of the recirculation device. The cooling pins are arranged in parallel with air flow, thereby reducing a temperature deviation and the highest temperature point.

3 Claims, 5 Drawing Sheets

BLOWER HOUSING OF HYDROGEN RECIRCULATION DEVICE OF FUEL CELL VEHICLE

CROSS-REFERENCE TO RELATED APPLICATION

This application claims the benefit under 35 U.S.C. §119(a) on Korean Patent Application No. 10-2007-0085889, filed on Aug. 27, 2007, the entire contents of which are incorporated herein by reference.

BACKGROUND

1. Technical Field

The present invention relates to a blower housing of a hydrogen recirculation device for a fuel cell vehicle.

2. Background Art

A hydrogen recirculation device for a fuel cell vehicle serves to collect and compress hydrogen and supply hydrogen to a fuel cell stack by using a blower motor.

A hydrogen side of a common distributor has a very high relative humidity due to water generated in a fuel cell stack and external humidifying water, and condensation occurs a lot in a fuel cell stack.

If condensate water is not appropriately removed and goes back into a fuel cell stack, a supply of reactant gas is disturbed, whereby the effective reactant area size is reduced, causing a severe threat to driving.

Removing condensate water from the fuel cell system is very important for a cold start of an engine. If water remains in the fuel cell system when an operation of the fuel cell system stops, it may freeze and cause a malfunction of the system.

In the hydrogen recirculation device, condensate water can be generated by a temperature change when hydrogen is compressed and supplied to a fuel cell stack. In order to minimize the generation of condensate water, a temperature deviation in the hydrogen recirculation device should be kept uniform, and a housing should be designed to keep its temperature distribution uniform when heat is discharged through cooling pins.

In a conventional art, as shown in FIG. 1, cooling pins 11 are arranged outside a housing body 10 without considering air flow direction in a fuel processing system (FPS) 15, whereby cooling efficiency is remarkably low and a temperature deviation is large.

FIG. 2 shows a computational fluid dynamics (CFD) interpretation which represents a heat transfer inside the FPS of the conventional hydrogen recirculation device.

In the housing of the conventional hydrogen recirculation device, as shown in FIG. 2, the cooling pins 11 are arranged in a vertical direction to the air flow direction. Therefore, a heat discharging effect is small, and it is difficult to achieve sufficient cooling effect using air flow when internally generated heat is externally discharged.

Thus, a rear portion of the housing which is opposite to air flow partially has a high temperature value, badly affecting durability of an insulating film of a motor.

In addition, a plurality of stagnation points of air flow are generated due to such arrangement of the cooling pins, and thus a flow separation point on a surface of the housing moves forward, whereby there is a disadvantage in designing a cooling structure which considers air flow.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the aforementioned problems associated with prior arts and one object of the present invention is to provide a blower housing of a hydrogen recirculation device for a fuel cell vehicle in which cooling pins are arranged in the direction of air flow and a flow separation point of an external surface of the housing is moved to a rear portion of the housing, so that a cooling effect using air flow is increased and a temperature deviation gets uniform.

In one aspect, the present invention provides a blower housing of a hydrogen recirculation device for a fuel cell vehicle, comprising a plurality of cooling pins installed on a perimeter of a cylindrical housing body installed in a fuel processing system of the hydrogen recirculation device. The cooling pins are arranged in parallel with air flow, thereby reducing a temperature deviation and the highest temperature point.

In a preferred embodiment, the plurality of cooling pins are arranged in a concentric circle form spaced from each other at a regular interval along the perimeter of the cylindrical housing body.

In another preferred embodiment, the housing body comprises a power supplying portion located so as to face an inlet of the fuel processing system, through which air flows in.

In still another preferred embodiment, the housing body further comprises guide vanes provided near both sides of the housing body, thereby creating an air flow separation point at a rear portion of the housing body.

In a further preferred embodiment, the blower housing may further comprise brackets mounting the housing body at its both sides. In this embodiment, the guide vanes are supported by the brackets. Preferably, each of the guide vanes is formed of a plate which is bent with the same curvature as the housing body so as to maintain the same distance from the whole area of the perimeter of the housing body.

In another aspect, the present invention provides a blower housing of a hydrogen recirculation device for a fuel cell vehicle, which comprises guide vanes (13) provided near both sides of a housing body (10), thereby creating an air flow separation at a rear portion of the housing body (10).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present blower housings will be particularly useful with a wide variety of motor vehicles.

Other aspects of the invention are discussed infra.

BRIEF DESCRIPTION OF THE DRAWINGS

The above and other features of the present invention will be described in reference to certain exemplary embodiments thereof with reference to the attached drawings in which.

DETAILED DESCRIPTION

Figure 1:
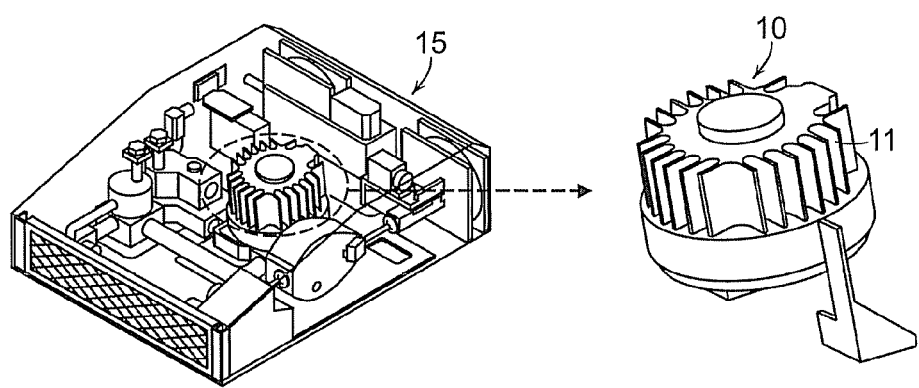
FIG. 1 is a perspective view illustrating an FPS and a blower housing of a conventional fuel cell vehicle.
Figure 2:
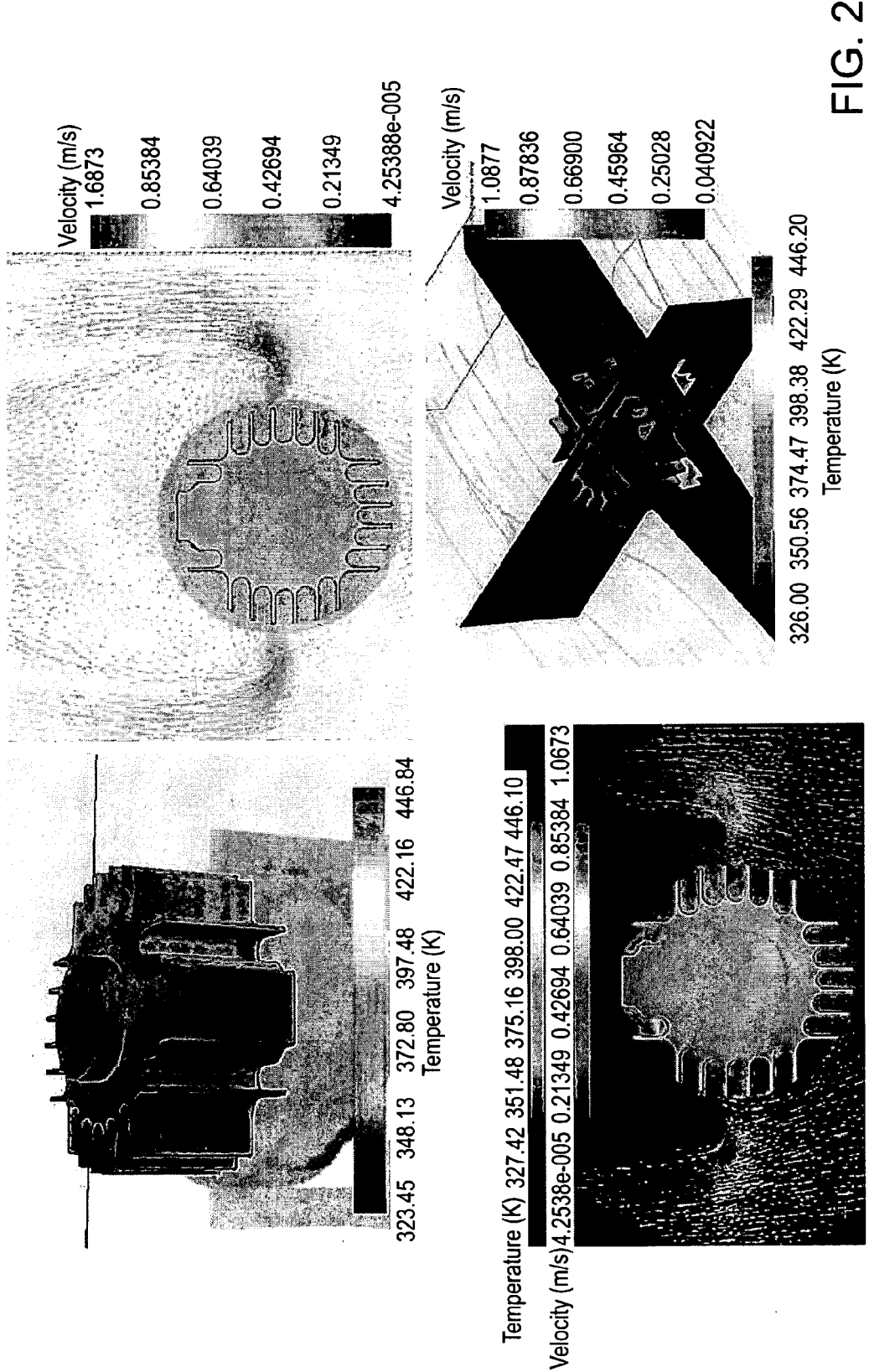
FIG. 2 shows a CFD interpretation of heat transfer in the FPS according to the conventional art.

Reference will now be made in detail to the embodiments of the present invention, examples of which are illustrated in the accompanying drawings, wherein like reference numerals refer to the like elements throughout. The embodiments are described below in order to explain the present invention by referring to the figures.

The present invention provides a housing of an improved shape. In the housing of the present invention, air flow in an FPS as a hydrogen supplying module and a heat discharging are considered to keep a uniform temperature distribution, so that generation of condensate water is prevented, and high reliability for durability is secured even though heat inside the housing is increased.

According to the present invention, an improved housing structure is provided in which cooling pins are formed in a shape in view of direction of air flow and a flow separation point is created at a rear portion of the housing body, thereby increasing the cooling effect.

First, the shape of cooling pins according to a preferred embodiment of the present invention is described in detail below.

In case of the conventional housing, since the cooling pins are arranged in a vertical direction to air flow, the cooling effect is degraded, and since a flow stagnation point is generated at a location of the cooling pins, it is difficult to obtain sufficient cooling effect.

Figure 3:
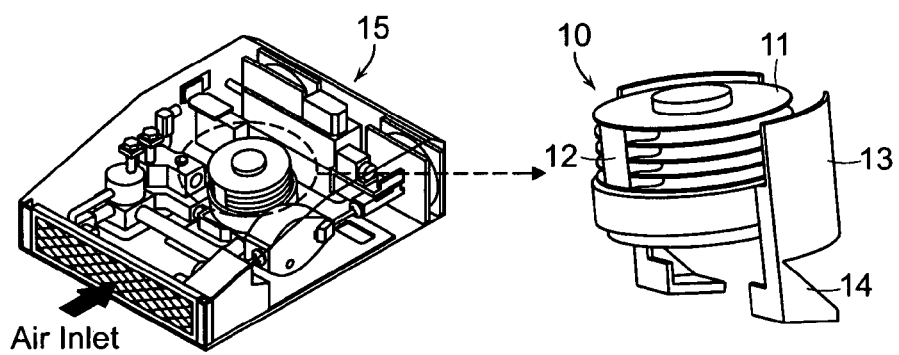
FIG. 3 is a perspective view illustrating an FPS and a blower housing of a fuel cell vehicle according to an exemplary embodiment of the present invention.

By contrast, as shown in FIG. 3, according to a preferred embodiment of the present invention, cooling pins are arranged in parallel with air flow, so that heat of a hydrogen recirculation device is discharged by using air flowing in through an FPS air filter. Also, a housing is rotated 180° compared to the conventional one, so that a rear portion of the housing in which a plurality of rubbers of a hydrogen recirculation device are distributed, i.e., a portion where a power supplying device is installed is located so as to face an air influx portion, thereby helping cooling of an insulating film.

More particularly, the cooling pins 11 are arranged in a parallel direction to air flow direction along a perimeter of a housing body 10 installed in an FPS 15.

Here, the cooling pins 11 are horizontally arranged in a concentric circle form spaced from each other at a regular interval along the perimeter of the cylindrical housing body 10.

A power supplying portion 12 is arranged in the housing body 10 to face an inlet of the FPS 15 through which air flows in.

Figure 4:
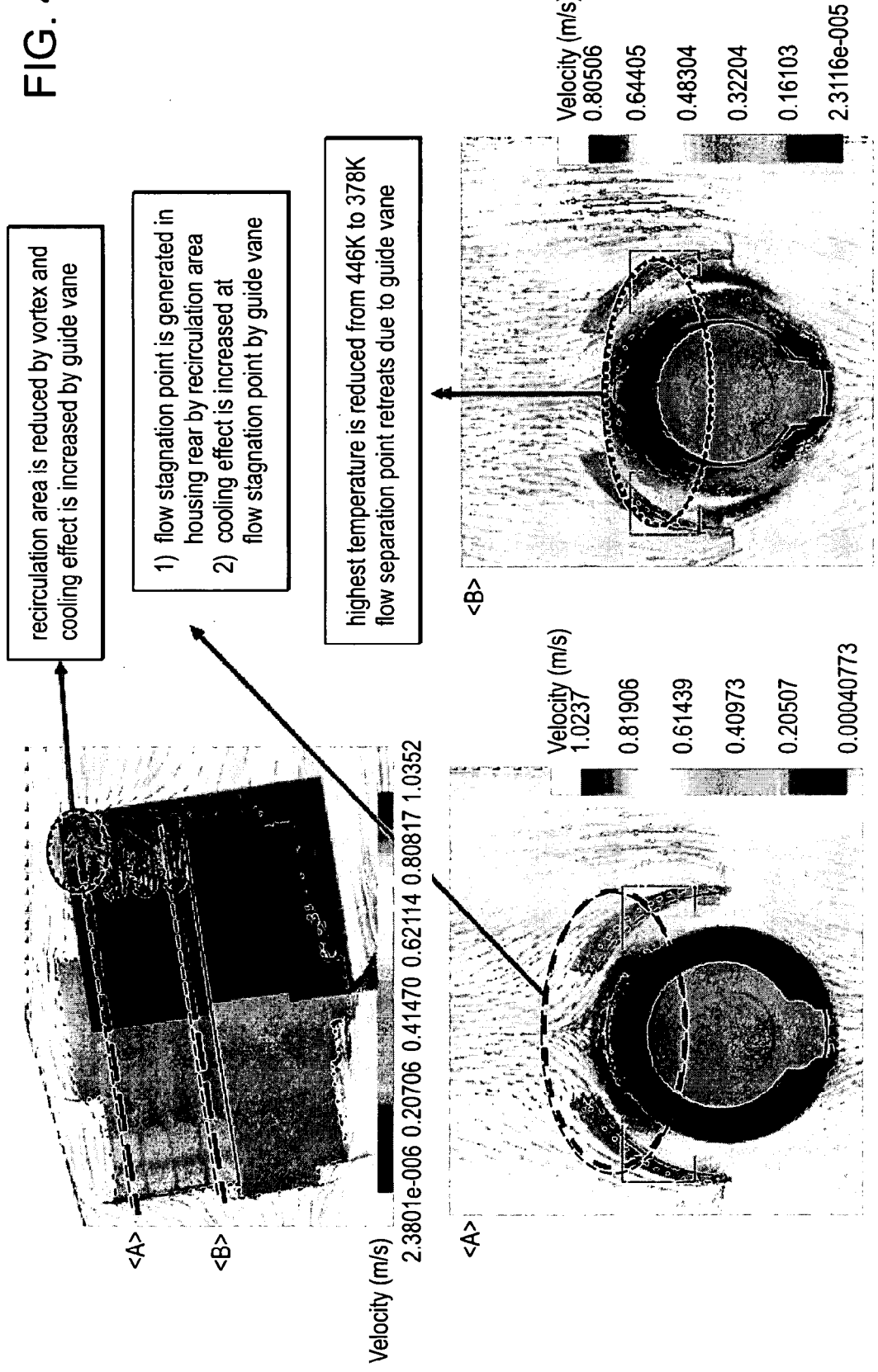
FIG. 4 shows a CFD interpretation of heat transfer in the FPS according to the exemplary embodiment of the present invention.

FIG. 4 shows a result of a CFD interpretation when the cooling pins and the power supplying portion described above are applied to the housing.

As shown in FIG. 4, compared to the conventional art, the highest temperature of the housing is lowered, an effective cooling is possible in a position where an overheat occurs in the conventional art.

The cooling effect using air flow is increased by arranging the cooling pins in parallel with air flow.

Next, the configuration for delaying a flow separation point to increase the cooling effect is described in detail below.

Air for cooling which flows in through an air filter of the FPS is exhausted through the rear of the FPS by an exhausting fan and absorbs heat generated from components of the FPS while passing through the components before being exhausted.

At this time, the cooling performance is degraded due to a flow stagnation point and a vortex generated in the rear of the hydrogen recirculation device which are caused from a flow separation of the hydrogen recirculation device. In order to prevent such flow separation, at least one guide vane is installed.

The guide vane installed in the rear of the hydrogen recirculation device serves to prevent a phenomenon that the cooling performance is degraded because air flow is separated from the hydrogen recirculation device.

Also, the guide vane induces air around the hydrogen recirculation device to flow, making it possible for the hydrogen recirculation device to have more uniform temperature distribution.

For example, as shown in FIG. 3, two guide vanes 13 are preferably arranged to be supported by brackets 14 in both sides of the housing body 10 and the guide vanes are apart from the perimeter of the housing body 10. Each of the guide vanes 13 is preferably formed of a plate which is bent with the same curvature as the housing body 10 so as to maintain the same distance from the whole area of the perimeter of the housing body 10.

Figure 5:
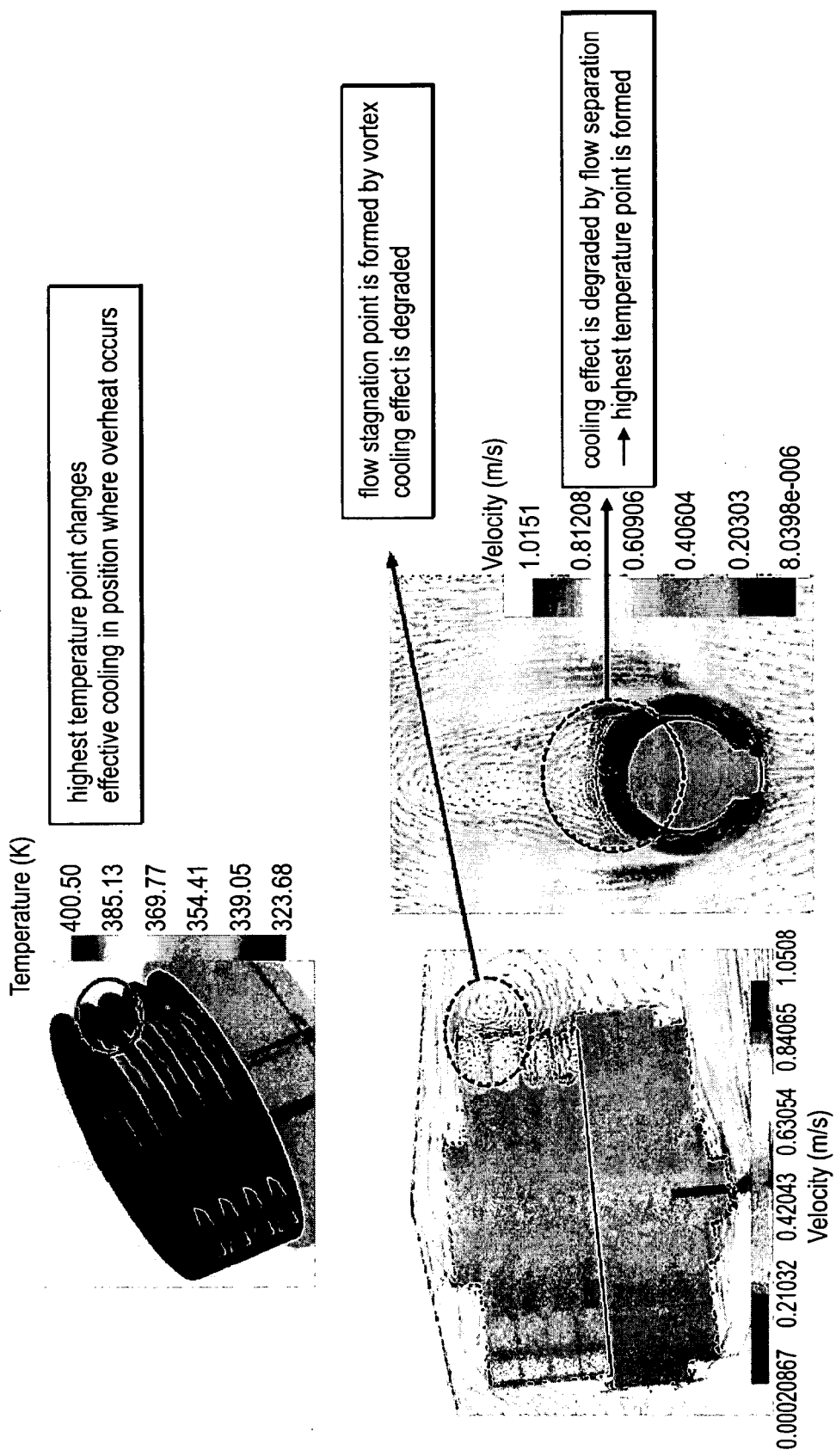

The cooling effect is increased as shown in the result of a CFD interpretation of FIG. 5. Since the flow separation point retreats by the guide vanes, the cooling effect using air flow is increased, and the temperature deviation of the hydrogen recirculation device is reduced.

As described above, in order to prevent condensate water from being generated, it is important for the blower housing of the hydrogen recirculation device to have uniform temperature distribution. In order to improve the durability of the insulating film and the motor, it is important to design the cooling pins in consideration of air flow direction in the FPS so as to efficiently discharge heat generated by, for example, friction.

The more effective cooling can be achieved because the power supplying portion in which a plurality of silicon rubbers are distributed is located in the cooling air influx portion.

For example, a portion (where a plurality of silicon rubbers are distributed) for supplying a power to drive a blower motor of the hydrogen recirculation device is located before air flow, and the cooling pins are arranged in a parallel direction to air flow.

The guide vane is installed in the rear of the hydrogen recirculation device to induce air to flow around the hydrogen recirculation device.

In this instance, the rear of the hydrogen recirculation device is cooled along the guide vane due to inertia of air flow, thereby reducing the temperature deviation.

The guide vane is a necessary part to give the inertia effect of an air flow.

With the above described configuration, the hydrogen recirculation device can prevent the condensate water from being generated by the temperature deviation and can also prevent the motor and the insulating film from being overheated due to the effective cooling.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A blower housing of a hydrogen recirculation device for a fuel cell vehicle, comprising
a plurality of disk shaped cooling pins installed on a perimeter of a cylindrical housing body installed in a fuel processing system of the hydrogen recirculation device, wherein the cooling pins are arranged in parallel with air flow, thereby reducing a temperature deviation and the highest temperature point, wherein the cylindrical housing body further comprises guide vanes provided near both sides of the housing body, thereby creating an air flow separation point at a rear portion of the cylindrical housing body, and further comprising brackets mounting the cylindrical housing body at its both sides, wherein the guide vanes are supported by the brackets and each of the guide vanes is formed of a plate which is bent with the same curvature as the cylindrical housing body to maintain the same distance from the whole area of the perimeter of the cylindrical housing body so that a flow separation point retreats by the guide vanes to increase the cooling effect using air flow and reduce temperature deviation.

2. The blower housing of claim 1, wherein the plurality of cooling pins are arranged in a concentric circle form spaced from each other at a regular interval along the perimeter of the cylindrical housing body.

3. The blower housing of claim 1, wherein the housing body comprises a power supplying portion located to face an inlet of the fuel processing system, through which air flows in.

\* \* \* \* \*